(12) United States Patent
Adamson et al.

(10) Patent No.: US 9,239,126 B2
(45) Date of Patent: Jan. 19, 2016

(54) TWIST JACK STAND APPARATUS AND METHOD

(71) Applicant: Service Solutions U.S. LLC, Wilmington (DE)

(72) Inventors: Eric Adamson, Owatonna, MN (US); Jose Barrios, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 171 days.

(21) Appl. No.: 13/682,437

(22) Filed: Nov. 29, 2012

(65) Prior Publication Data

US 2014/0145042 A1 May 29, 2014

(51) Int. Cl.
*F16M 13/00* (2006.01)
*F16M 11/04* (2006.01)
*F16M 11/22* (2006.01)

(52) U.S. Cl.
CPC .............. *F16M 11/046* (2013.01); *F16M 11/22* (2013.01); *F16M 2200/028* (2013.01)

(58) Field of Classification Search
USPC .............. 248/157, 161, 125.8, 407, 423, 352, 248/354.1, 354.4, 354.5
See application file for complete search history.

(56) References Cited

U.S. PATENT DOCUMENTS

| 453,094 | A | * | 5/1891 | Taylor ........................... 280/304 |
| 3,730,027 | A | * | 5/1973 | Rohn ............................... 81/462 |
| 4,385,849 | A | * | 5/1983 | Crain .......................... 403/109.3 |
| 4,556,163 | A | * | 12/1985 | Lundman .................... 228/173.6 |
| 5,335,754 | A | * | 8/1994 | Gibson ........................... 182/204 |
| 5,520,360 | A | * | 5/1996 | Wensman .................. 248/354.5 |
| 5,680,732 | A | * | 10/1997 | Skouras ....................... 52/126.1 |
| 5,901,935 | A | * | 5/1999 | Lai .............................. 248/354.1 |
| 5,988,754 | A | * | 11/1999 | Lamart et al. ............. 297/423.38 |
| 6,138,973 | A | * | 10/2000 | Woodward .................... 248/423 |
| 7,240,885 | B1 | * | 7/2007 | Sullivan ....................... 248/354.1 |
| 8,066,247 | B2 | * | 11/2011 | Spera ....................... 248/354.5 |

* cited by examiner

*Primary Examiner* — Steven Marsh
(74) *Attorney, Agent, or Firm* — Baker & Hostetler LLP

(57) ABSTRACT

A load supporting stand that having a longitudinal axis is disclosed. The supporting stand has an upper column that includes a shaft having a first end and a second end that extends along the longitudinal axis. The shaft has a first diameter. The upper column also includes a shelf attached to the first end of said shaft. The upper column also has a load bearing pin that extends transversely through the shaft. The stand also has a base portion that receives the upper column that includes a receiving conduit that extends along the longitudinal axis and has a second diameter greater than the first diameter. The conduit has a third end and a fourth end and a slot that extends between the third and fourth ends along with a series of notches extending therefrom. The base portion has a base plate connected to the receiving conduit.

20 Claims, 4 Drawing Sheets

TWIST JACK STAND APPARATUS AND METHOD

FIELD OF THE INVENTION

The present invention relates generally to a load bearing or load supporting stand to be used with automobiles or the like. More particularly, the present invention relates to an automotive or truck maintenance jack stand that can be easily raised or lowered by the operator to support a load.

BACKGROUND OF THE INVENTION

Elevating a portion of a vehicle typically involves using some sort of jack. For example, many automobiles carry or employ a scissor-type jack to elevate a portion of the automobile in order to change a tire or otherwise view the under side of the automobile. Typically, during operation the jack is placed under a portion of the frame of the automobile and the jack is slowly raised until a platform on the jack engages the frame of the automobile. Thereafter, a user uses the principle of leverage to elevate a portion of the frame. Often, more than one location on the frame needs to be elevated so that a user can repair a portion of the automobile that is only accessible from the bottom. Because most standard jacks are movable, so that the jack may be easily moved to many different portions of the frame, a vehicle supported solely by the jack may be unstable and unsafe to work under. For this reason, a user may place a jack stand or load bearing stand under the frame and lower the jack so that the vehicle is supported on the jack stand instead of the jack itself. Alternatively, the jack stand may be used solely to support the vehicle in such cases where it is not desired to employ a jack or elevate the automobile.

The jack stand is typically a stable platform for supporting the vehicle. Because the jack and jack stand have individual and separate support structures, the jack stand and jack typically cannot support the vehicle at same location on the frame. Or, the jack stand or jack must engage the frame of the automobile only at designated positions or areas which can be difficult to identify said locations. This can cause a problem when a manufacturer designates only certain locations as jacking locations. Generally, vehicle manufacturers reinforce certain locations on the frame of a vehicle so that those certain locations can support a portion of the weight of the vehicle when the vehicle is elevated with a jack or some sort of support mechanism.

Generally, jack stands can vary in size, shape and geometry. For example, some designs comprise pyramid-shaped structures having three or four sides and an adjustable support platform disposed in the top of the jack stand. Such designs further include a telescoping support member extending from a top portion of the pyramid and a curved horizontal support, often having a U-shape, at the top of the telescoping support member to cradle a portion of the vehicle frame. The support member is often adjustable with a ratchet type mechanism. Problems occur with placement of this type of platform as only certain parts of the frame or undercarriage can fit in the curved horizontal support. While a jack stand is usually more stable than a jack, the jack stand cannot support the vehicle at the same point that is occupied by the jack. As a result, the jack stand often must be placed a considerable distance away from the jacking location in order to find a portion of the frame or undercarriage that is compatible with the top of the support platform, necessarily requiring a higher jacking elevation to accommodate the jack stand location. Also, the aforementioned designs each typically have to be operated with both hands as it is very difficult to operate with a single hand. Moreover, said designs employ several components which must be cast or machined to fine tolerances which can be a drawback as casting can be inconsistent with regard to tolerances and machining tends to be expensive.

Accordingly, it is desirable to provide a jack stand that may be positioned in a confined space beneath a vehicle. Moreover, it is desirable to provide a jack stand that allows technicians to place the stand and raise it to a desired height with a single hand. It is further desired to provide a jack stand that is easily operated by a single handle and is economical to manufacture and produce.

SUMMARY OF THE INVENTION

According to one such embodiment of the present invention, a load supporting stand that having a longitudinal axis is provided, comprising: an upper column, said upper column comprising: a shaft having a first end and a second end that extends along the longitudinal axis, wherein said shaft has a first diameter; a shelf attached to said first end of said shaft; and a load bearing pin that extends transversely into said shaft; a base portion that receives said upper column, said base portion comprising: a receiving conduit that extends along the longitudinal axis, wherein said receiving conduit has a second diameter greater than said first diameter and includes a third end and a fourth end and a first slot that extends between said third and fourth ends, wherein said first slot includes a series of notches extending therefrom; and a base plate connected to said receiving conduit that extends generally normal to the longitudinal axis.

In another embodiment, a method of supporting a load using a load supporting stand is provided, comprising: placing the load bearing stand at a desired position under a load to be supported, wherein the stand comprises: an upper column, said upper column comprising: a shaft having a first end and a second end that extends along the longitudinal axis, wherein said shaft has a first diameter; a shelf attached to said first end of said shaft; and a load bearing pin that extends transversely into said shaft; a base portion that receives said upper column, said base portion comprising: a receiving conduit that extends along the longitudinal axis, wherein said receiving conduit has a second diameter greater than said first diameter and includes a third end and a fourth end and a slot that extends between said third and fourth ends; and a base plate connected to said receiving conduit that extends generally normal to the longitudinal axis; rotating the shaft of the upper column in a first direction and translating the shaft upward away from the base portion such that the shelf engages the load to be supported; and rotating the shaft of the upper column in a second, opposite direction so that the load bearing pin engages one of the series of notches.

In yet another embodiment, a load supporting stand having a longitudinal axis is provided, comprising: means for placing the load bearing stand at a desired position under a load to be supported, wherein the stand comprises: an upper column, said upper column comprising: a shaft having a first end and a second end that extends along the longitudinal axis, wherein said shaft has a first diameter; a shelf attached to said first end of said shaft; and a load bearing pin that extends transversely into said shaft; a base portion that receives said upper column, said base portion comprising: a receiving conduit that extends along the longitudinal axis, wherein said receiving conduit has a second diameter greater than said first diameter and includes a third end and a fourth end and a slot that extends between said third and fourth ends; and a base plate connected to said receiving conduit that extends generally normal to the longitudinal axis; means for rotating the shaft of the upper column in a first direction and translating the shaft upward away from the base portion such that the shelf engages the load to be supported; and means for rotating the shaft of the upper column in a second, opposite direction so that the load bearing pin engages one of the series of notches.

In another embodiment of the present invention, a load supporting stand that having a longitudinal axis is provided, comprising: an upper column, said upper column comprising: a shaft having a first end and a second end that extends along the longitudinal axis, wherein said shaft has a first diameter a shelf attached to said first end of said shaft; and a load bearing pin that extends transversely into said shaft; a base portion that receives said upper column, said base portion comprising: a receiving conduit that extends along the longitudinal axis, wherein said receiving conduit has a second diameter less than said first diameter and includes a third end and a fourth end and a first slot that extends between said third and fourth ends, wherein said first slot includes a series of notches extending therefrom; and a base plate connected to said receiving conduit that extends generally normal to the longitudinal axis.

In still another embodiment, a method of supporting a load using a load supporting stand is provided, comprising: placing the load bearing stand at a desired position under a load to be supported, wherein the stand comprises: an upper column, said upper column comprising: a shaft having a first end and a second end that extends along the longitudinal axis, wherein said shaft has a first diameter; a shelf attached to said first end of said shaft; and a load bearing pin that extends transversely into said shaft; a base portion that receives said upper column, said base portion comprising: a receiving conduit that extends along the longitudinal axis, wherein said receiving conduit has a second diameter less than said first diameter and includes a third end and a fourth end and a slot that extends between said third and fourth ends; and a base plate connected to said receiving conduit that extends generally normal to the longitudinal axis; rotating the shaft of the upper column in a first direction and translating the shaft upward away from the base portion such that the shelf engages the load to be supported; and rotating the shaft of the upper column in a second, opposite direction so that the load bearing pin engages one of the series of notches.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
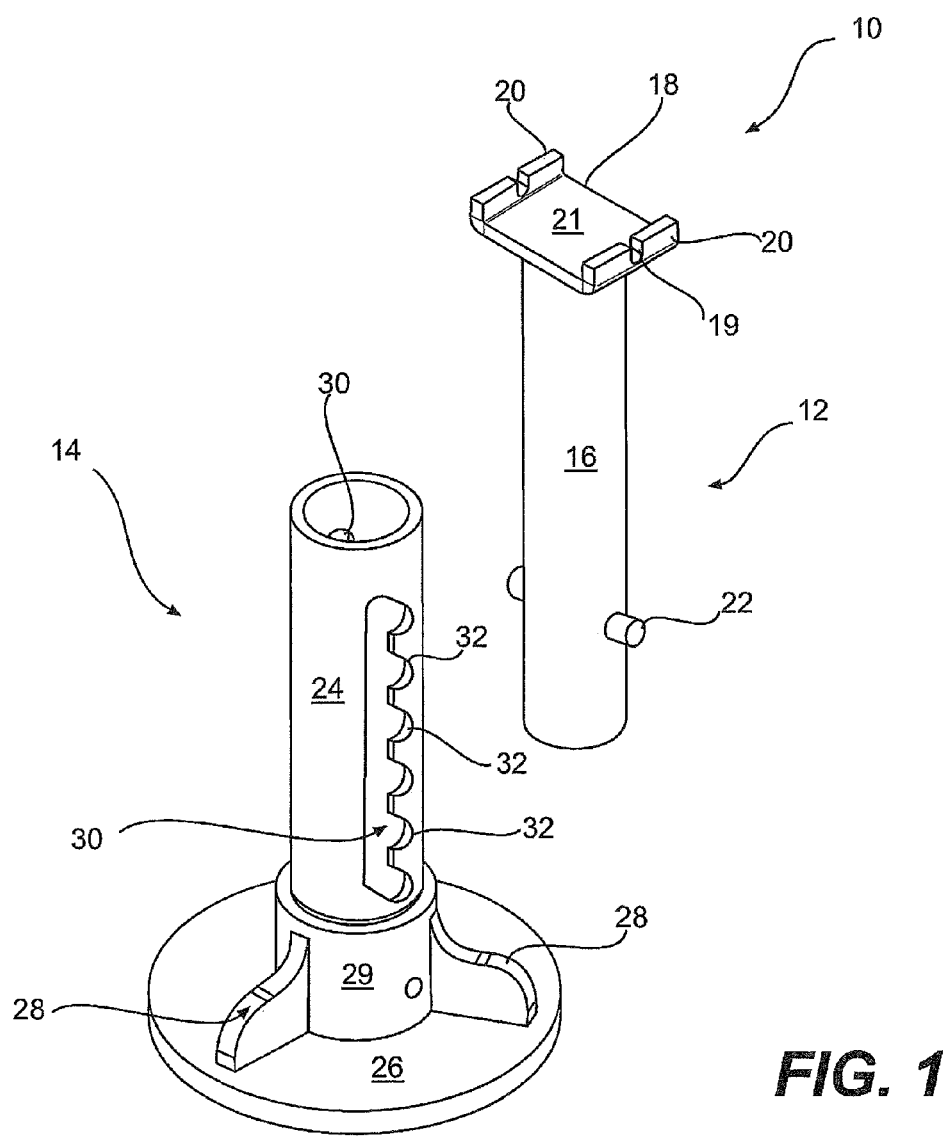
FIG. 1 is an exploded, perspective view of the jack stand illustrating an upper column and a base in accordance with an embodiment of the present invention.

An embodiment of the present inventive system for a load supporting stand, or jack stand, generally designated 10 is provided. Turning specifically to FIG. 1, the load supporting stand includes an upper column generally designated 12 and a lower, base portion generally designated 14. The upper column 12 has a shaft or a cylindrical portion 16 having a diameter. The upper column 12 includes an engagement portion or bracket or shelf 18 that includes a planar base 21 and opposing sides 20 extending therefrom. In one embodiment the base 21 extends normal to the shaft 16 while the sides 20 extend parallel thereto providing a shelf or bracket. Each side includes a groove 19. The upper column 12 further comprises a load bearing pin 22 that extends through the shaft 16.

Turning now to the base portion 14, it includes a receiving conduit 24 preferably having a diameter greater than or less than that of the upper column 12. The base portion 14 further includes a base 26 from which the receiving conduit 24 extends. The base 26 includes a plurality of support legs 28 that extend from a collar 29 that is attached to the base 26. The collar 29 has a diameter greater than or less than that of the receiving conduit 24 whereby the receiving conduit 24 is retained by the collar 29.

The collar 29 and its respective support legs 28 are attached to the base 26 via any preferred mechanical attachment means. Such attachment means may include welding, bolt attachment or the like. The receiving conduit 24 is received by the collar 29 as previously discussed. The receiving conduit is attached to the collar 29 via friction fit or bolt connection. Alternatively, the receiving conduit 24 may be welded to the collar 29.

While a single geometry or design of the base 26 and the respective support legs 28 is depicted, alternative designs and geometries are encompassed by the present invention. For example, while one embodiment of the present invention employs three support legs (only two illustrated) 28, more or less support legs 28 may or may not be employed or utilized depending upon the use of the load bearing support. For example, in one design, two legs may suffice whereas in an alternative design four legs may be preferred. Similarly, the geometry of the base 26 may vary as desired or needed. For example, while a circular geometry is illustrated, a non-circular geometry is encompassed by the present invention. Such non-circular geometries such as square, a rectangular or the like may also be used or employed.

As illustrated in FIG. 1, the receiving conduit 24 includes opposing slots 30 having series of notches 32 that receive the load bearing pin. As illustrated, the slots 30 extend longitudinally along the receiving conduit 24 while the notches 32 extend transversely therefrom. While in one embodiment of the present invention, opposing slots 30 are employed, alternative embodiments may employ a single slot 30. Moreover, while the notches 32 extend transversely and downwardly at an angle, alternative embodiments encompassed by the present invention may include notches 32 that extend normal to the slot 30.

The upper column 12 and base portion 14, and the related features and/or components that are comprised in each of the upper column 12 and base portion 14, may be constructed from various materials depending upon the desired use of the end user. For example, the various components of the load supporting stand, or jack stand 10 may be constructed steel or any steel or metal alloy. Alternatively, the load supporting stand, or jack stand and its various components, including the upper column 12 and the base portion 14, may be constructed materials such as carbon fiber, plastic metals and/or aluminum.

Figure 2:
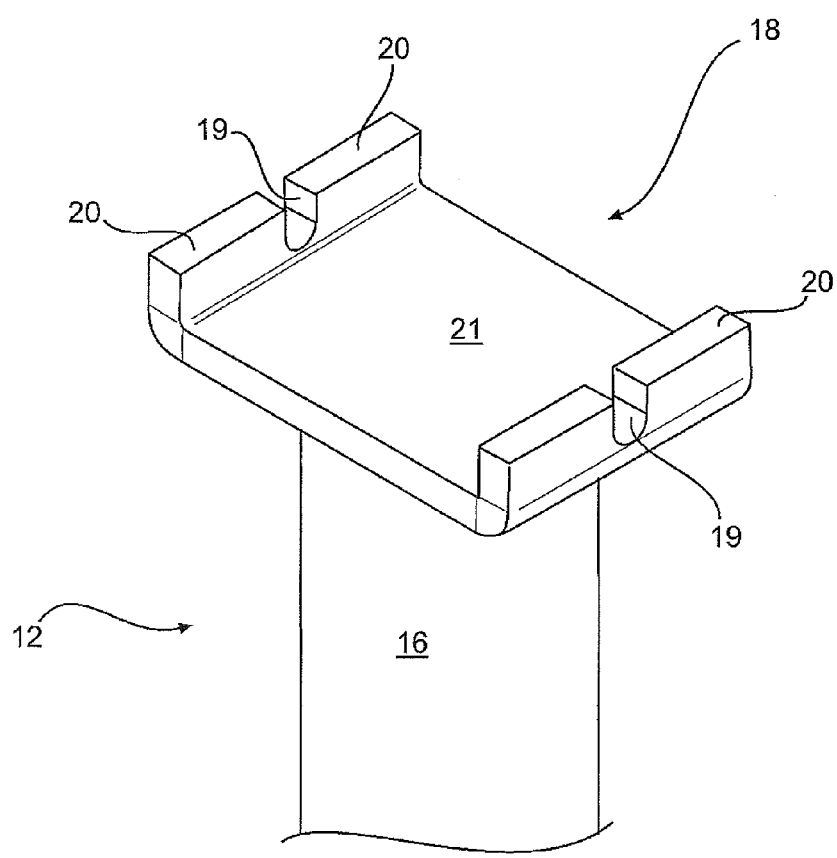
FIG. 2 is a perspective view of the upper column of the jack stand depicted in FIG. 1.

Turning now to FIG. 2, the upper column 12 is illustrated in detail. As previously discussed, the upper column 12 comprises a shaft 16 and engagement portion or bracket or shelf 18. The bracket 18 includes the planar base portion 21 along with the opposing sides 20. As illustrated, each of the opposing sides 20 extend generally parallel to one another. Moreover, each of the sides 20 has a groove 19. While the sides 20 each have grooves 19, alternative embodiments of the present invention may include sides 20 without grooves. As illustrated, the bracket 18 with its planar base portion 21 along with the opposing sides 20 and respective grooves 19 is designed to engage or mate with a with an area or portion of an undercarriage of an automobile for example, that is designed to receive the bracket 18.

The bracket or shelf 18 may vary in geometry and design to conform varying automobile designs, or alternatively, may take any designed shape or geometry to engage or mate with a load to be supported. The above-described bracket or shelf 18 design is not limited to the geometry that is depicted. Moreover, the bracket or shelf 18 and its features, the planar base portion 21 along with the opposing sides 20 and respective grooves 19, may be constructed such that they are integral to one another, or may be individual components attached to one another. Furthermore, the bracket or shelf 18 may be attached to the attached to the shaft 16 via any mechanical attachment means such as welding, for example, or integral with the shaft 16.

Figure 3:
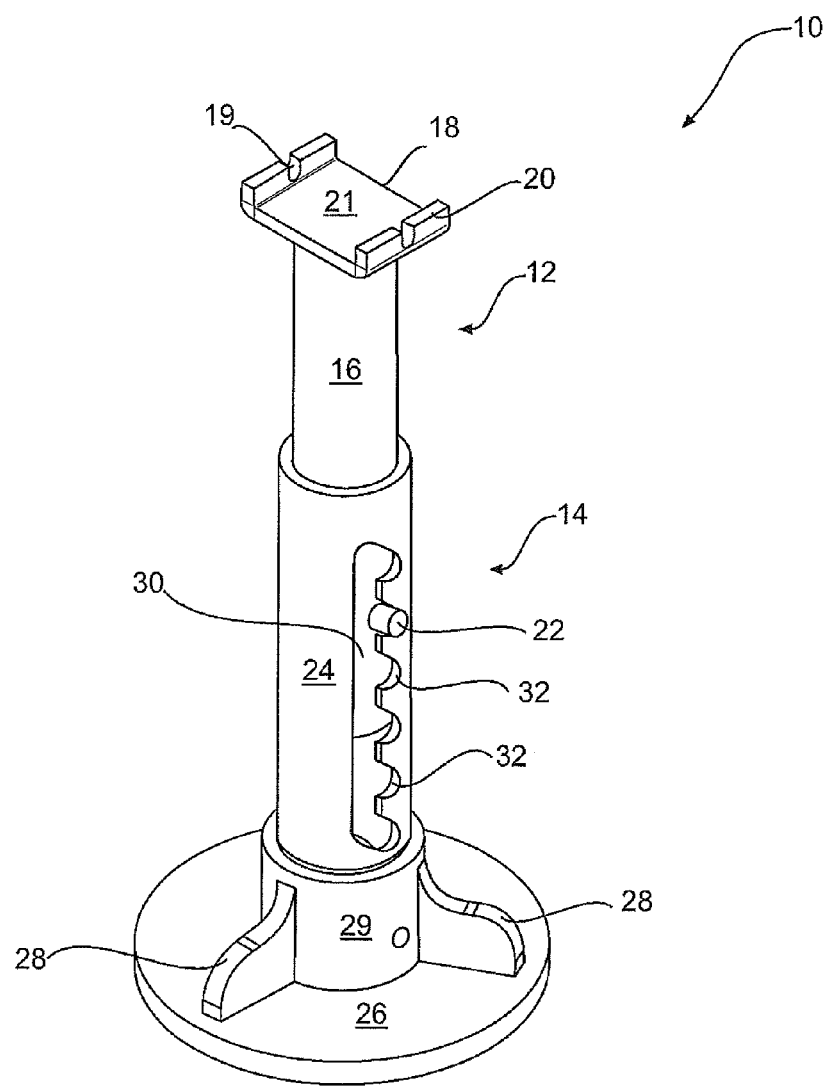
FIG. 3 is a perspective view of a jack stand in accordance with an embodiment of the present invention.
Figure 4:
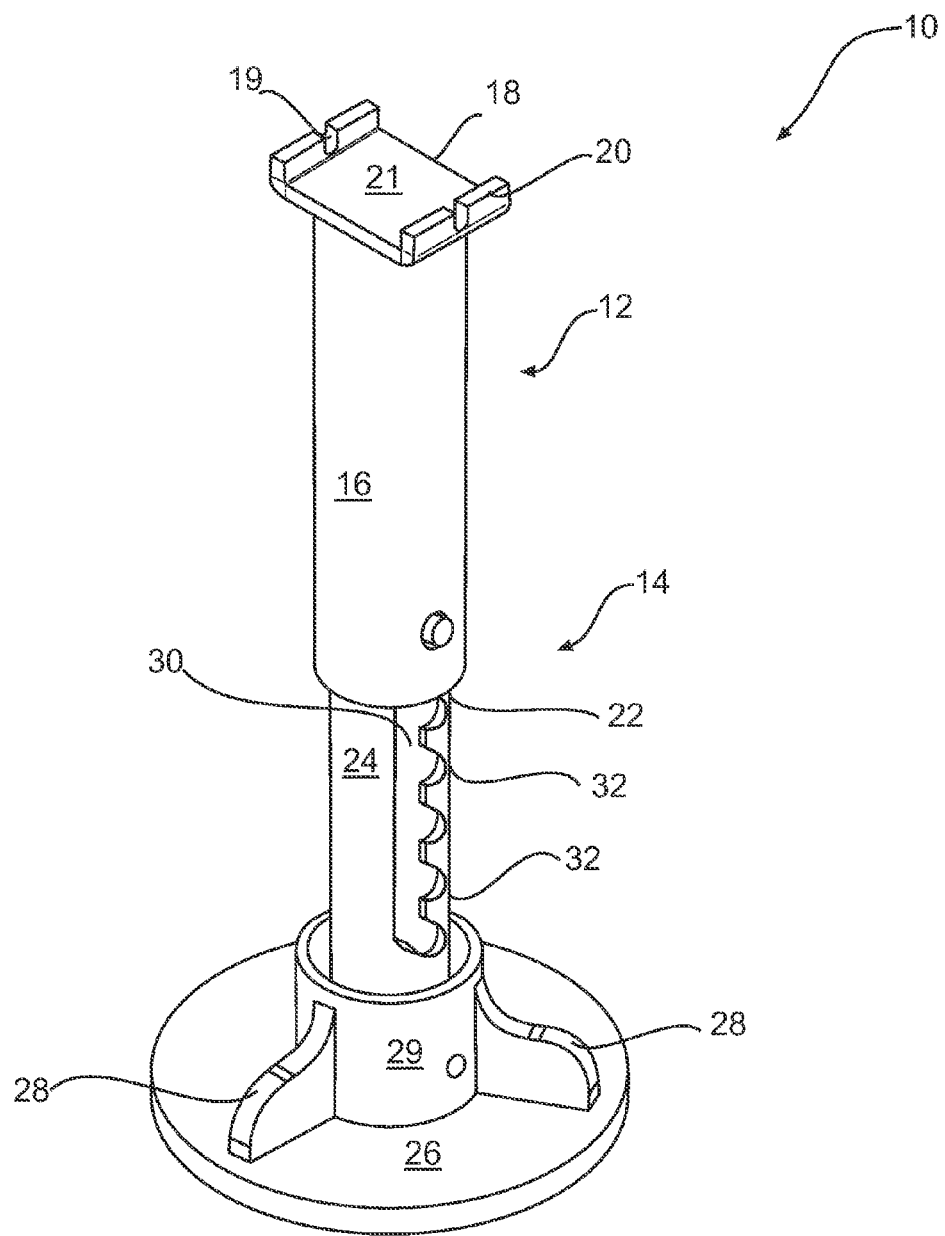
FIG. 4 is a perspective of the jack stand with the conduit having a diameter less than a diameter of the upper column.

Turning now to FIG. 3, the load supporting stand 10 is illustrated fully assembled and in its operational position. As previously discussed, the upper column 12 has a shaft 16 that has a diameter that is less than that of the receiving conduit 24 of the base portion 14. Accordingly, the shaft 16 of the upper column 12 is inserted into the receiving conduit 24 allowing the shaft 16 to translate or telescope within the receiving conduit 24. The shaft 16 may be inserted, as discussed above, by removing the load bearing pin 22 prior to insertion of the shaft 16 into the receiving conduit 24. Once the shaft 16 is inserted into the receiving conduit 24, the load bearing pin 22 may be inserted or re-inserted such that it extends through the shaft 16 to engage the slots 30. Alternatively, the load bearing pin 22 may be spring loaded. By spring loaded it is meant the load bearing pin 22 may be expanded and contracted on spring biased force. Accordingly, in this embodiment, prior to insertion of the shaft into the conduit 24, the load bearing spring 22 may be depressed allowing the load bearing pin 22 to clear the diameter of the conduit 24 and enabling the shaft 16 to be inserted into the conduit 24. Once the shaft 16 is inserted, the loading bearing pin 22 may be released such that the it expands under the spring force, expanding into the slot 30.

As previously discussed, and as depicted in FIG. 3, the load bearing pin 22 is positioned within slots 30 (only one depicted) where it translates or slides to a desired notch 32. The load bearing extends transversely into the shaft 16, allowing it to engage each slot 30.

During operation, the load bearing stand 10 may be easily placed in confined spaces beneath an automotive vehicle or the like. Moreover, during operation the load bearing stand 10 may be placed in said confined space and raised to a desired height with a single hand of the operator. This may be accomplished whereby the operator first places the load bearing stand 10 beneath the frame of an automobile or the like at the desired location. Next, the customer may translated or telescope the upper column such that the bracket 18 engages the frame of the automobile to be supported. The operator may then twist or rotate the shaft 24 such that the load bearing pin 22 engages the corresponding notch 32. The shaft 16 may be rotated the opposite direction, disengaging the load bearing pin 22 from the corresponding notch 32 and thereby disengaging the bracket 18 from the automobile frame.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A load supporting stand having a longitudinal axis, comprising:
    an upper column, said upper column comprising:
        a shaft having a first end and a second end, the shaft extends along the longitudinal axis, wherein said shaft has a first diameter;
        a shelf attached to said first end of said shaft and configured to support a portion of a vehicle; and
        a load bearing pin that extends transversely into said shaft;
    a base portion that receives said upper column, said base portion comprising:
        a receiving conduit that extends along the longitudinal axis, wherein said receiving conduit has a second diameter greater than said first diameter and includes a third end and a fourth end; and
        a first slot that extends between said third and fourth ends;
    a base plate connected to said receiving conduit and extends generally normal to the longitudinal axis, wherein said first slot includes a series of notches, each notch extending transversely and at a downwardly angle toward said base plate; and
    a collar attached to said base plate, wherein said collar has a third diameter greater than said second diameter and wherein said collar receives said receiving conduit.

2. The load supporting stand according to claim 1, further comprising a first leg and a second leg extending from said collar, wherein said first leg and said second leg are each attached to said base plate.

3. The load supporting stand according to claim 1, further comprising a second slot that opposes said first slot and extends between said third and fourth ends.

4. The load supporting stand according to claim 3, wherein said second slot comprises the series of notches.

5. The load supporting stand according to claim 4, wherein said shelf comprises:
   a flat planar portion;
   a first side wall; and
   a second side wall that opposes said first side wall.

6. The load supporting stand according to claim 5, wherein said load bearing pin is positioned adjacent said second end.

7. The load supporting stand according to claim 6, wherein said load bearing pin extends through said shaft and engages said first slot and said second slot.

8. The load supporting stand according to claim 7, wherein said load bearing pin mates with said notches.

9. The load supporting stand according to claim 1, wherein said load bearing pin is a spring biasing pin.

10. The load supporting stand according to claim 4, wherein each notch extends transversely and at said downwardly angle to the longitudinal axis toward said base plate.

11. The load supporting stand according to claim 1, wherein said base plate is circular in geometry.

12. The load supporting stand according to claim 1, wherein said shelf is a bracket.

13. The load supporting stand according to claim 1, wherein said shelf has a rectangular geometry.

14. The load bearing shelf according to claim 5, wherein said first side wall and said second side wall each include a groove.

15. A method of supporting a load using a load supporting stand, comprising:
   placing the load supporting stand at a desired position under a load to be supported, wherein the stand comprises:
      an upper column, said upper column comprising:
         a shaft having a first end and a second end, the shaft extends along a longitudinal axis, wherein said shaft has a first diameter;
         a shelf attached to said first end of said shaft and configured to support a portion of a vehicle; and
         a load bearing pin that extends transversely into said shaft;
      a base portion that receives said upper column, said base portion comprising:
         a receiving conduit that extends along the longitudinal axis, wherein said receiving conduit has a second diameter greater than said first diameter and includes a third end and a fourth end; and
         a slot that extends between said third and fourth ends; and
      a base plate connected to said receiving conduit that extends generally normal to the longitudinal axis, wherein said slot includes a series of notches, each notch extending transversely and at a downwardly angle toward said base plate;
   rotating the shaft of the upper column in a first direction and translating the shaft upward away from the base portion such that the shelf engages the load to be supported; and
   rotating the shaft of the upper column in a second, opposite direction so that the load bearing pin engages one of the series of notches.

16. The method according to claim 15, further comprising the steps of:
   rotating the shaft of the upper column in the first direction to disengage the load bearing pin from the one of the series of notches;
   translating the upper column towards the base portion; and
   disengaging the shelf from the load to be supported.

17. The method according to claim 16, further comprising a collar attached to said base plate, wherein said collar has a third diameter greater than said second diameter and wherein said collar receives said receiving conduit.

18. A load supporting stand having a longitudinal axis, comprising:
   an upper column, said upper column comprising:
      a shaft having a first end and a second end, the shaft extends along the longitudinal axis, wherein said shaft has a first diameter;
      a shelf attached to said first end of said shaft and configured to support a portion of a vehicle; and
      a load bearing pin that extends transversely into said shaft;
   a base portion that receives said upper column, said base portion comprising:
      a receiving conduit that extends along the longitudinal axis, wherein said receiving conduit has a second diameter greater than said first diameter and includes a third end and a fourth end; and
      a pair of opposing slots that extends between said third and fourth ends;
   a base plate connected to said receiving conduit that extends generally normal to the longitudinal axis, wherein said slots include a series of notches, each notch extending transversely and at a downwardly angle toward said base plate, wherein the load bearing pin engages one of the series of notches; and
   a collar attached to said base plate, wherein said collar has a third diameter less than said second diameter and wherein said collar receives said receiving conduit.

19. A load supporting stand that having a longitudinal axis, comprising:
   an upper column, said upper column comprising:
      a shaft having a first end and a second end, the shaft extends along the longitudinal axis, wherein said shaft has a first diameter;
      a shelf attached to said first end of said shaft and configured to support a portion of a vehicle; and
      a load bearing pin that extends transversely into said shaft;
   a base portion that receives said upper column, said base portion comprising:
      a receiving conduit that extends along the longitudinal axis, wherein said receiving conduit has a second diameter less than said first diameter and includes a third end and a fourth end; and
      a first slot that extends between said third and fourth ends;
   a base plate connected to said receiving conduit and extends generally normal to the longitudinal axis, wherein said first slot includes a series of notches, each notch extending transversely and at a downwardly angle toward said base plate; and
   a collar attached to said base plate, wherein said collar has a third diameter less than said second diameter and wherein said collar receives said receiving conduit.

20. A method of supporting a load using a load supporting stand, comprising:
   placing the load supporting stand at a desired position under a load to be supported, wherein the stand comprises:
      an upper column, said upper column comprising:
         a shaft having a first end and a second end, the shaft extends along the longitudinal axis, wherein said shaft has a first diameter;

a shelf attached to said first end of said shaft and configured to support a portion of a vehicle; and
a load bearing pin that extends transversely into said shaft;
a base portion that receives said upper column, said base portion comprising:
a receiving conduit that extends along the longitudinal axis, wherein said receiving conduit has a second diameter less than said first diameter and includes a third end and a fourth end; and
a slot that extends between said third and fourth ends; and
a base plate connected to said receiving conduit that extends generally normal to the longitudinal axis, wherein said slot includes a series of notches, each notch extending transversely and at a downwardly angle toward said base plate;
rotating the shaft of the upper column in a first direction and translating the shaft upward away from the base portion such that the shelf engages the load to be supported; and
rotating the shaft of the upper column in a second, opposite direction so that the load bearing pin engages one of the series of notches.

* * * * *